United States Patent [19]

Reed

[11] E Re. 28,536

[45] Reissued Sept. 2, 1975

[54] ANIMAL HUSBANDRY

[76] Inventor: Jack Owen Reed, 81 Grand Ave., Englewood, N.J. 07605

[22] Filed: Mar. 4, 1971

[21] Appl. No.: 121,221

Related U.S. Patent Documents

Reissue of:

[64] Patent No.: 3,499,445
Issued: Mar. 10, 1970
Appl. No.: 572,697
Filed: Aug. 16, 1966

[52] U.S. Cl. ..... 128/264; 424/19; 424/22; 128/270; 128/268

[51] Int. Cl.[2] ..... A61M 31/00

[58] Field of Search..... 128/271, 270, 264, 1 R, 128/260; 119/1; 424/19, 20, 31

[56] References Cited

UNITED STATES PATENTS

| | | | |
|---|---|---|---|
| 2,541,447 | 2/1951 | Turner et al. | 119/1 |
| 2,895,875 | 7/1959 | Klette | 424/31 |
| 2,943,979 | 7/1960 | Elias | 128/270 X |
| 2,987,445 | 6/1961 | Levesque | 424/22 |
| 3,262,450 | 7/1966 | Elias | 128/270 |
| 3,279,996 | 10/1966 | Long et al. | 424/19 |

FOREIGN PATENTS OR APPLICATIONS

| | | | |
|---|---|---|---|
| 562,095 | 8/1958 | Canada | 424/22 |
| 722,629 | 6/1955 | United Kingdom | 424/19 |

OTHER PUBLICATIONS

"Nature" 206, p. 39–41, Apr. 3, 1965. Use of Progestagen–Impregnated Sponges Inserted Intravaginally or Subcutaneously for the Control of the Oestrous Cycle in Sheep.

*Primary Examiner*—Aldrich F. Medbery
*Attorney, Agent, or Firm*—Fidelman, Wolffe & Leitner

[57] ABSTRACT

The present invention involves an estrus block and enhancement method which predetermines when domestic animals such as cows, [sheep,] horses, etc., go into estrum. A medicament implant surgically inserted in the domestic animal slowly releases a medicament whose pharmacological action blocks occurrence of estrus, the total dosage available in the medicament implant being in excess of what will be absorbed over the residence period i.e., 14–18 days. Surgical removal of the implant after a predetermined period, i.e., from 14–18 days abruptly halts medication. A rebound phenomena enhances estrus and onset of estrum occurs in from 2–7 days following removal of the implant. By treating a group of cows in this fashion, onset of estrum for the entire group is synchronized and all may be artifically inseminated during the 2–7 days post removal period.

7 Claims, No Drawings

ANIMAL HUSBANDRY

Matter enclosed in heavy brackets [ ] appears in the original patent but forms no part of this reissue specification; matter printed in italics indicates the additions made by reissue.

---

The present invention relates to animal husbandry, and in particular to a technique for ensuring that a female domesticated animal goes into estrus at a desired predetermined time.

Breeding of domesticated animals according to their normal estrus cycles involves practical disadvantages which have long been recognized in animal husbandry. For example, the characteristic of a spring lamb crop depresses the price of fresh lamb at a certain time of the year, and makes fresh lamb unavailable at other times. A shift in the breeding cycle of the ewe to provide for either an early lamb or a late lamb would be desirable. Similarly, foaling of race horses between January 1 and 15 is highly desirable but not always attained. In some respects the problems in breeding beef cattle are particularly severe.

The large number of cattle (bovine species) and their economic value makes imperative breeding cows and heifers with the least possible number of highest quality bulls. The present invention provides, particularly, a technique for synchronization of estrus in a group of cows and heifers so that artificial insemination may be employed as the principal method of reproduction in the beef cattle industry.

Use of artificial insemination in breeding of cattle is now a standard technique but in large scale practice has been limited principally to dairy and other closely observed cows. Generally speaking, artificial insemination must be timed exactly to the period of estrus in the cow (about 14 hours) else it fails. As a practical matter this means that the animal must be under daily observation. Milking cows are observed at least twice a day for milking purposes, making it possible to observe exactly when each cow in the herd is in estrum. The services of an inseminator can be called for as required. In addition the cows of a dairy herd are easily confined and any one cow may be made available for insemination without difficulty. A cow observed in heat during the morning milking can be inseminated that afternoon. A cow observed in heat at the evening milking can be inseminated the following morning. Overall animal husbandry practices in the dairy industry including, for example, a relatively close confinement, supplementary feeding of concentrated high-energy feed stuffs, and heavy concentration of dairy herds in milk shed areas convenient to metropolitan centers have encouraged establishment of artificial insemination districts and regular routes therein.

The beef cattle industry however has, to a great extent, been unable to employ artificial insemination as a breeding technique, and in consequence, carries the economic load of an excessively large number of breeding bulls. The circumstances which make artificial insemination of dairy cattle feasible on a large scale, are absent in the beef cattle industry. Beef-cattle breeding cows and heifers are not normally confined. The many beef breeding herds are widely separated, and, routinely, are moved about on great tracts of grazing land: The cattle forage at will over the land, utilizing native grasses as their principal feed source. Only during period of scarce grass supply are they given limited supplemental moderate-energy feeds. The individual cows and heifers are not observed closely and the signs of estrus often pass unnoticed. Providing for an almost daily service by an inseminator in the vast thinly populated areas where beef cattle roam would involve a prohibitive expense.

However, if a substantial number of cows and heifers can be brought at one time into a fertile reproductive cycle, with estrus occurring more or less simultaneously, then artificial insemination techniques may be employed on beef cattle economically. Teams of inseminators could be arranged for in advance and large quantities of viable semen from frozen storage supplies made available to any preselected location.

The principal object of the present invention is to provide an estrus blocking and enhancement technique.

A further object of this invention is to provide a technique which allows predetermination of when a domestic animal goes into estrus.

Still another object of the present invention is to provide a technique for synchronizing estrus for a large number of cows and heifers.

Other objects and the advantages of the present invention will become more apparent from the detailed description thereof which follows.

Briefly stated the present invention involves a treatment sequence as follows:

(i) Surgically implanting a depot pellet whose pharmacologic action blocks occurrence of estrus during a period the female domestic animal would normally undergo estrus.

(ii) Permitting the implant to remain for about 14–18 days, during which period the medicament therein is released continuously and acts to block estrus.

(iii) Surgically removing the implant at the expiration of the 14–18 day period, thereby abruptly halting medication and by rebound phenomena enhance the estrus which occurs from 2–7 days following removal of the implant.

The animal may then be serviced.

According to practice of a preferred mode of the invention a large number, e.g., an entire herd, of breeding cows and heifers will be implanted at one time and the implants removed at one time. Then commencing on about the second post implant removal day and continuing until the seventh day the artificial inseminator will have available for insemination all of the cows and heifers in the herd. Insemination the 3rd, 4th and 5th day may suffice. The costs of artificial insemination thus spread among the large number of cows and heifers present in a breeding herd makes artificial insemination more economic than the heretofore practice of maintaining a number of breeding bulls for each large herd.

Aside from eliminating the out-of-pocket and other expenses of maintaining a bull herd solely for breeding purposes, synchronizing estrus by practice of the present invention and artificial insemination with semen from high quality bulls upgrades the quality of the calves.

Individually the manipulative techniques employed for practice of the present invention are not unknown to men who handle cattle herds and to veterinarians who treat cattle. Thus, after the first preliminary step of simply to assemble or roundup the animals in customary fashion, they are passed through a squeeze-chute for a one by one implantation according to facile implantation methods. A preferred technique of implantation, using sanitary surgical procedures, in the mid-cervical area, one to two inches ventral to the transverse process of the cervical vertebrae, is to cut a horizontal straight line opening through the skin only, approximately 1.5 inches in length. Introduce a pair of tissue separating forceps ventrally between the skin and the underlying musculature for approximately 1.5 inches, opening the forceps to form a subcutaneous pouch to receive the implant. The forceps are removed and the implant is introduced into the subcutaneous pouch. One or two mattress sutures then close the wound. If implantation is done during the fly season the wound should be protected against blow-fly infestation. The animal is then released from the squeeze-chute and is allowed to return to pasture.

For removal of the implant, after 14–18 days have elapsed the herd is again rounded up and each animal passed through a squeeze-chute. A second incision is made through the skin, immediately below the palpible implant. This incision should be of a half moon shape, apex ventral. The encasement around the residue of the implant pellet is then grasped with a surgical hook or a pair of tissue forceps and withdrawn from its subcutaneous depot site through the wound opening. Again the wound is closed with one or two mattress sutures providing for drainage at the appex, should irritation develop.

The actual medicament (which generally speaking may be termed a hormone) employed in the implant depot to block occurrence of estrus may be selected from a large number of materials. Many progestins exhibit this activity. Non-steroid materials such as stilbesterol and related stilbene compounds also act to block estrus. Indeed such medicaments or hormones are so widely known and so many of them are available in quantity that no particular medicament is singled out as preferred for practice of the present invention.

Following is a partial list of steroids which have been found suitable for practice of the present invention:

(1) Chlormadinone acetate
(2) Dimethisterone
(3) Ethisterone
(4) Hydroxyprogesterone
(5) Hydroxyprogesterone caproate
(6) Medroxyprogesterone
(7) Norethindrone
(8) Norethynodrel
(9) Progesterone
(10) 3 - ethylenedioxy, 17 - acetoxy, 6 - methyl-pregn-5-ene-20

Without being bound thereto it is theoried that the medicament acts to block estrus by suppressing pituitary activity and cause the chromophilic series of anterior pituitary gland cells (beta variety) to shift into a high pre-secretory condition with an abundance of secretory granules therein. Then when the implant is removed and thereby medication is halted suddenly, a rebound phenomena occurs with hypersecretion of gonadotrophic hormones resulting in an active manifestation of estrus within 2–7 days, often in cows and heifers within 3–5 days.

Substantial variations exist animal to animal in the minimum dose effective to block occurrence of estrus. Variations exist also in the rapidity with which medicament is absorbed from the implant depot. Further variation occurs in individual animal reaction to presence, subcutaneously, of the implant as a foreign body. To achieve synchronization a substantial total does (e.g. 200 mg. steroid) must therefore be made available to insure absorption of at least the minimum dose needed to attain the desired estrus blocking action. Fortunately, absorption from the implant of substantially larger quantities of active ingredient than are needed has not proven harmful to cows and heifers (or to other domestic animals). Presence of a substantial excess of active ingredient over and above the maximum quantity that might be absorbed by the animal in the 14–18-day implant residence period is important to estrus synchronization. The desired synchronization of estrus in a large number of cows and heifers in attained by essentially simultaneous cessation of medication to each animal. To repeat, the depot life is intended to be longer than the planned for 14–18 days of implant residence.

Then upon complete removal of the estrus block, there is opportunity for immediate rebound phenomena, producing an active well mainfested estrus in all the treated animals at what has become a predictable and uniform period of time, i.e. 2–7 days following removal of the estrus blocking implant. The normal variation from animal to animal alluded to above in: absorption rate, minimum dose, etc., results then in only a few days variation in timing of estrus, i.e., estrus now occurs between 2–7 days to post implant removal, and for cows and heifers 3–5 days may be more exact. Such a brief time period is self-evidently an improvement over the random pattern which normally would occur in a breeding herd. The cow is polyestrus with an average cycle of about 21 days, but individual animals may vary from 18–24 days. Accordingly practice of this invention with its 14–18-day implant period and the 2–7-day waiting period roughly coincides with a normal cycle, serving in virtually every animal to delay estrus somewhat, which explains perphaps the rebound phenomena.

Allusion has already been made to need for extended life in the implant. In consequence the active ingredient should be formulated into a depot composition of limited solubility to provide for the desired slow absorption rate. Advantageously many of the estrus blocking agents available, e.g., the steriods, are themselves relatively insoluable in aqueous media (i.e., lymph) facilitating thereby compounding and formulation. An additional factor which must be considered is that need for ultimate removal of the implant dictates, first some sort of porous or foraminous encasement for the implant depot which can be grasped (by forceps or the like) for removal, and second a depot which will not disintegrate to leave behind unabsorbed particles of active medicament. Advantageously, the depot may be a shaped pellet, e.g., in the form of a disc, oval, sphere, cube, etc., with the active ingredient concentrated in the outermost regions thereof, and only inert ingredients in the central or core regions. A relatively large inert core provides structural integrity for the pellet, avoiding disintegration thereof during the implant residence period. Surgical removal of the encasement then takes with it all the residue of the pellet depot.

A preferred depot for the implant is a three layer compressed powder disc shaped pellet wherein the active ingredient is present in appropriately diluted form only in the two outer layers of the disc; the large center or core layer contains only inert ingredients. The center layer adds sufficient bulk to the disc to prevent easy breakage and fragmentation during the implant period. Once implanted in a foraminous encasement subcutaneously only the outer layers of the pellet are bathed by lymph fluid to relase slowly the active ingredient therefrom during the entire implant period. The implant pellet encasement should be a non-absorbable carrier, desirably of plastic, inert metal, or other non-absorbable and non-irritating substance.

By way of specific example, the following formulation is presented for a 3-layered compressed disc.

(a) Formulation for upper and lower layers (each layer)

| | Mg. |
|---|---|
| Cholesterol | 100 |
| Active ingredient (3-ethylene dioxy 17-acetoxy, 6-methyl pregn-5-ene-20-one) | 100 |
| Carbowax (4000)(a polyethylene glycol) | 45 |
| Magnesium stearate | 5 |
| Total | 250 |

(b) Formulation for core layer

| | Mg. |
|---|---|
| Cholesterol | 2000 |
| Carbowax (4000) | 450 |
| Magnesium stearate | 50 |
| Total | 2500 |

The above formulations are compounded then compressed in separate layers with the active formulations as the outside layers using commercially available tableting equipment. When the 3-layer disc shaped tablets are employed as implants (using a polyethylene foraminous encasement) on beef cows and heifers estrus occurs in the entire group in from a 2–7-day post implant period.

Desirably, the cows and heifers are confined for this 2–7-day period before estrus manifestation. The use of one or more vasectomized bulls equipped with colored chest markers, can exactly indicate one by one when each cow and heifer comes into heat for subsequent prompt insemination. However, the close timing permits an alternative scheme of inseminating all of the treated cows and heifers commencing on the second post implant removal day and continuing for 3–5 more days.

While the present invention has been described principally in terms of beef cattle and artificial insemination it should be appreciated that the estrus blocking and enhancement technique of the present invention may be employed when suitable quality male animals are available and for other than the bovine species. For sheep breeding, for example, the value of rams for wool production reduce the importance of artificial insemination as a breeding technique. Nontheless, practice of the estrus block and enhancement technique of the present invention offers certain advantages in properly scheduling sheep breeding. The ewe shifts from an anestrus state to a polyestrun state at the end of summer. The lamb is dropped 5 months later. An economic advantage accrues to the sheep producer who is first with lambs or who is last with lambs. Employment, therefore, of the estrus block and enhancement technique of the present invention in multiparous ewes about September 1 assures that this group of ewes gestate on their first estrus cycle and drop the earliest lambs for later early marketing purposes. Conversely, employment of the technique in late November on virgin ewes results in delayed conception for this group and a very late spring lamp crop. As a side effect the number of lambs produced at peak production period (about March) becomes reduced.

Practice of the present invention has been described without allusion to alternative techniques for estrus block and enhancement. Prior are efforts along such lines through oral medication are known (certainly in humans). However, oral techniques are not particularly applicable to ruminants like sheep and cows. Individual variations in appetite and the multiple stomachs, of ruminants combine to reduce to a virtual uncertainty the affect of orally ingested estrus blocking medications. This unpredictability of effect is worse when the animals are fed en masse. A crowding factor (sometimes known as pecking order in chickens) causes the more aggressive animals to monopolize feed supplies. Timid animals might not even obtain sufficient feed to be properly dosed.

Other types of parenteral administration e.g., intramuscular, intraveneous, subcutaneous, typically are in fluid paste or other forms that suffer from the disadvantages of being in a non-removable form which must remain active until its pharmocological action is exhausted. These administration modes are distinguished by a lack of timing or synchronization. A planned for sudden cessation of medication in a group of animals is difficult to obtain.

Even in non-ruminant animals such as horses and pigs, parenteral administration of a removable implant according to practice of present invention may be more advantageous than oral administration. Horses are a relatively small but important area of use because of the well known desirability of foaling between January 1st and January 15th. By practice of the present invention an early full estrus period may be produced in lieu of a first quiescent early estrus (as is normal in the mare) which may pass unnoticed by the stallion, thereby attaining a January 1–15 foaling date instead of one a cycle (twenty-two days) later when full estrus manifestation would normally occur.

The pellet already described may be employed on horses. A mature sow requires approximately one-half the dosage of a cow and the already described composition in a smaller pellet size is applicable. For sheep one-quarter of the dosage described for the cow is adequate.

What is claimed is:

1. An estrus block and enhancement technique which comprises:

(i) [ surgically ] *subcutaneously* inserting into a female domestic animal *selected from the group consisting of cattle, horses and pigs* an implant of a medicament whose pharmacologic action blocks occurrence of estrus, (ii) permitting the implant to remain in the animal and continuously release medicament for about 14–18 days, said implant being adapted to release medicament continuously for at least 18 days, and (iii) surgically removing said implant at the expiration of said 14–18-day waiting period, thereby halting medication, whereby a rebound phenomenon enhances estrus and onset of estrum occurs in from 2–7 days following removal of said implant.

2. The method of claim 1 wherein multiple numbers of female animals are implanted at one time and implants are removed at one time and synchronized estrus in the so treated group is attained.

3. The method of claim 1 wherein the female animal is artificially inseminated daily during said 2–7-day period.

4. The method of claim 1 wherein a plurality of cows and heifers are implanted at one time and the implants removed at one time, whereby estrus of the group is synchronized to within a 2–7-day period.

5. The method of claim 4 wherein said cows and heifers are artificially inseminated daily during said 2–7-day period.

6. The method of claim 4 wherein said cows and heifers are artificially inseminated daily for the 3rd, 4th, 5th post implant removal days.

[ 7. The method of claim 1 wherein the implant is subcutaneous.]

8. A depot adapted for subcutaneous implant purposes comprising an estrus blocking medicament compounded with inert diluent and formulated into a multilayer pellet, with said medicament being present only in the outermost layer portions of said pellet and at least one core layer containing only a non-dissolving inert diluent, said core layer being substantially larger than the medicament containing outermost layer portions.

* * * * *